United States Patent [19]

Christensen

[11] 4,175,638

[45] Nov. 27, 1979

[54] ELECTRONICALLY CONTROLLED FOUR-WHEEL STEERING

[75] Inventor: Robert F. Christensen, Racine, Wis.

[73] Assignee: J. I. Case Company, Racine, Wis.

[21] Appl. No.: 965,855

[22] Filed: Dec. 4, 1978

Related U.S. Application Data

[63] Continuation-in-part of Ser. No. 941,186, Sep. 11, 1978, abandoned, which is a continuation of Ser. No. 844,509, Oct. 21, 1977, abandoned.

[51] Int. Cl.² .............................................. B62D 5/08
[52] U.S. Cl. .................................... 180/140; 180/79.1
[58] Field of Search ...................... 180/140, 22, 23, 46, 180/79.1, 45

[56] References Cited

U.S. PATENT DOCUMENTS

| | | | |
|---|---|---|---|
| 3,903,983 | 9/1975 | Yeske | 180/140 |
| 4,043,422 | 8/1977 | Barrett | 180/140 |

Primary Examiner—John A. Pekar
Attorney, Agent, or Firm—Dressler, Goldsmith, Clement, Gordon & Shore, Ltd.

[57] ABSTRACT

A control mechanism for a steering system for individually or simultaneously controlling the turning movements of the front and rear wheels of a vehicle is disclosed herein. The steering system is capable of controlling the movement of the rear wheels in a plurality of modes with respect to the front wheels and one mode in which the rear wheels are independently controlled. The control mechanism includes a control member that is pivoted on the frame of the vehicle to a plurality of positions to move an actuating switch that is part of the control means to a plurality of positions corresponding to the respective modes of steering and actuating means that cooperates with a signal producing device that produces a control signal to independently control the turning movement of the rear wheels.

19 Claims, 10 Drawing Figures

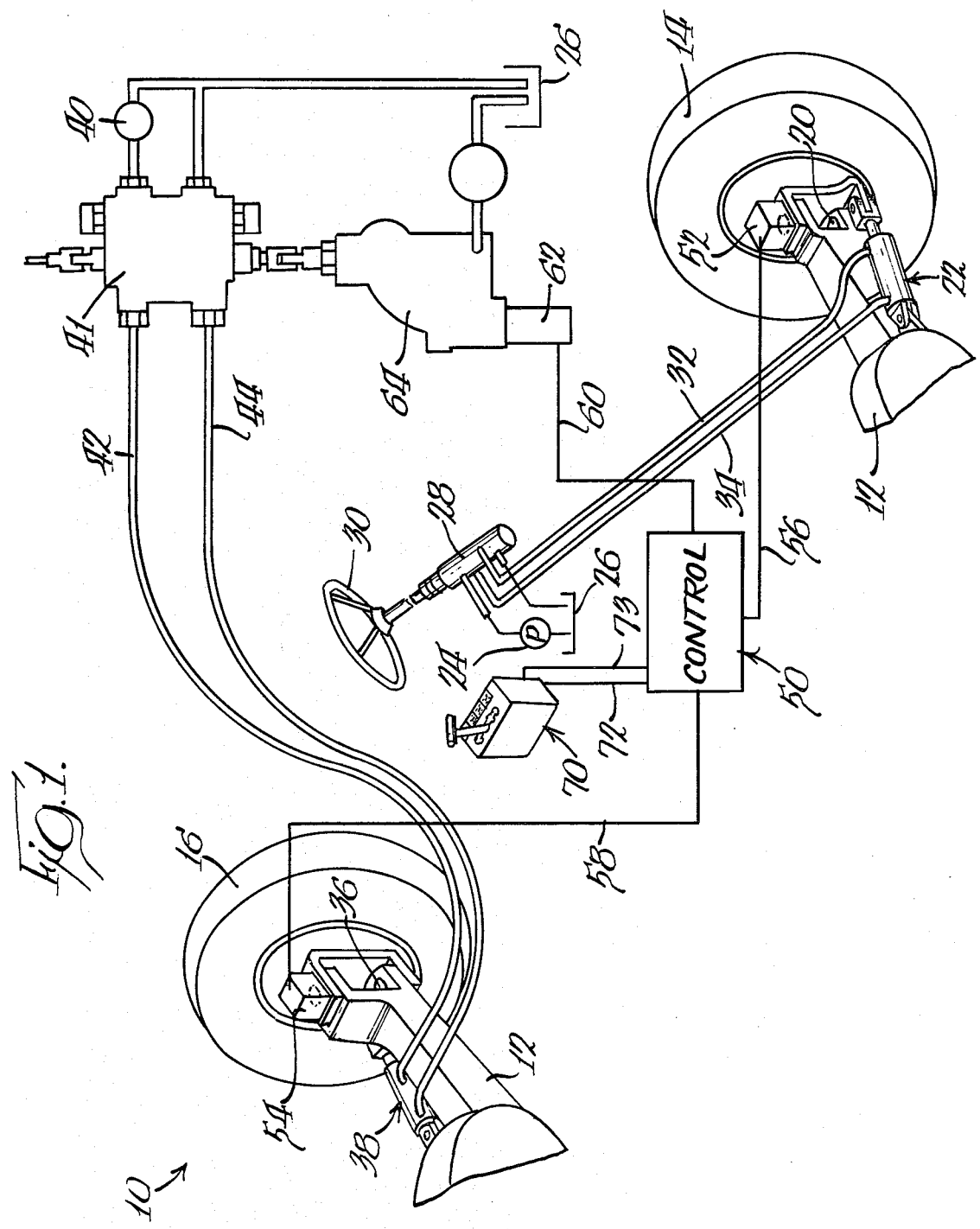

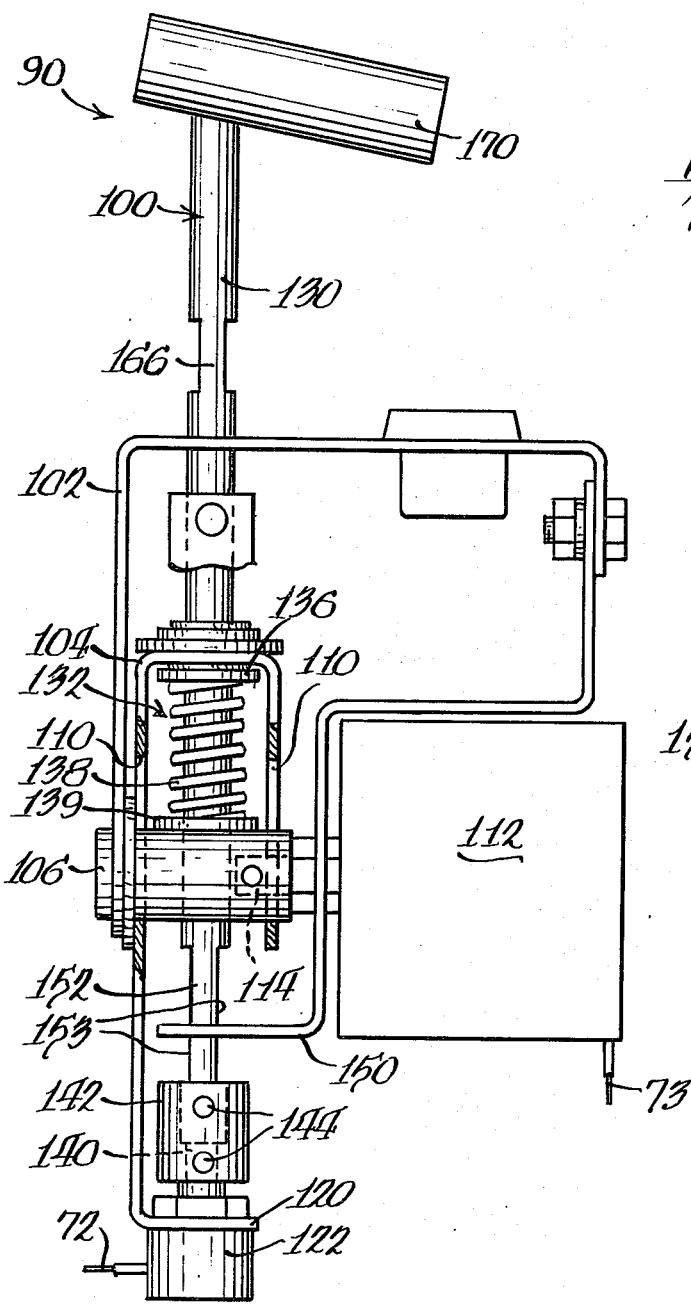
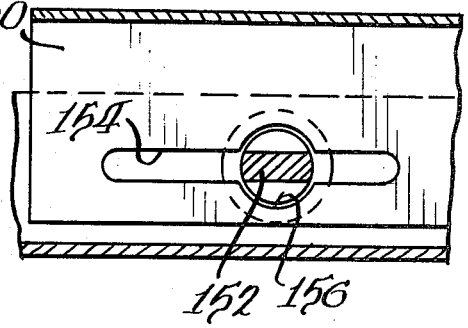
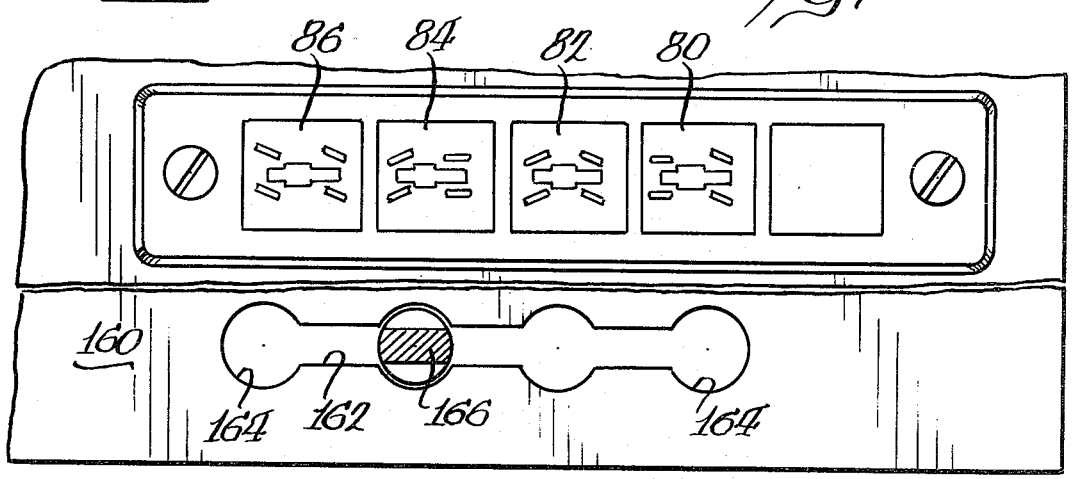

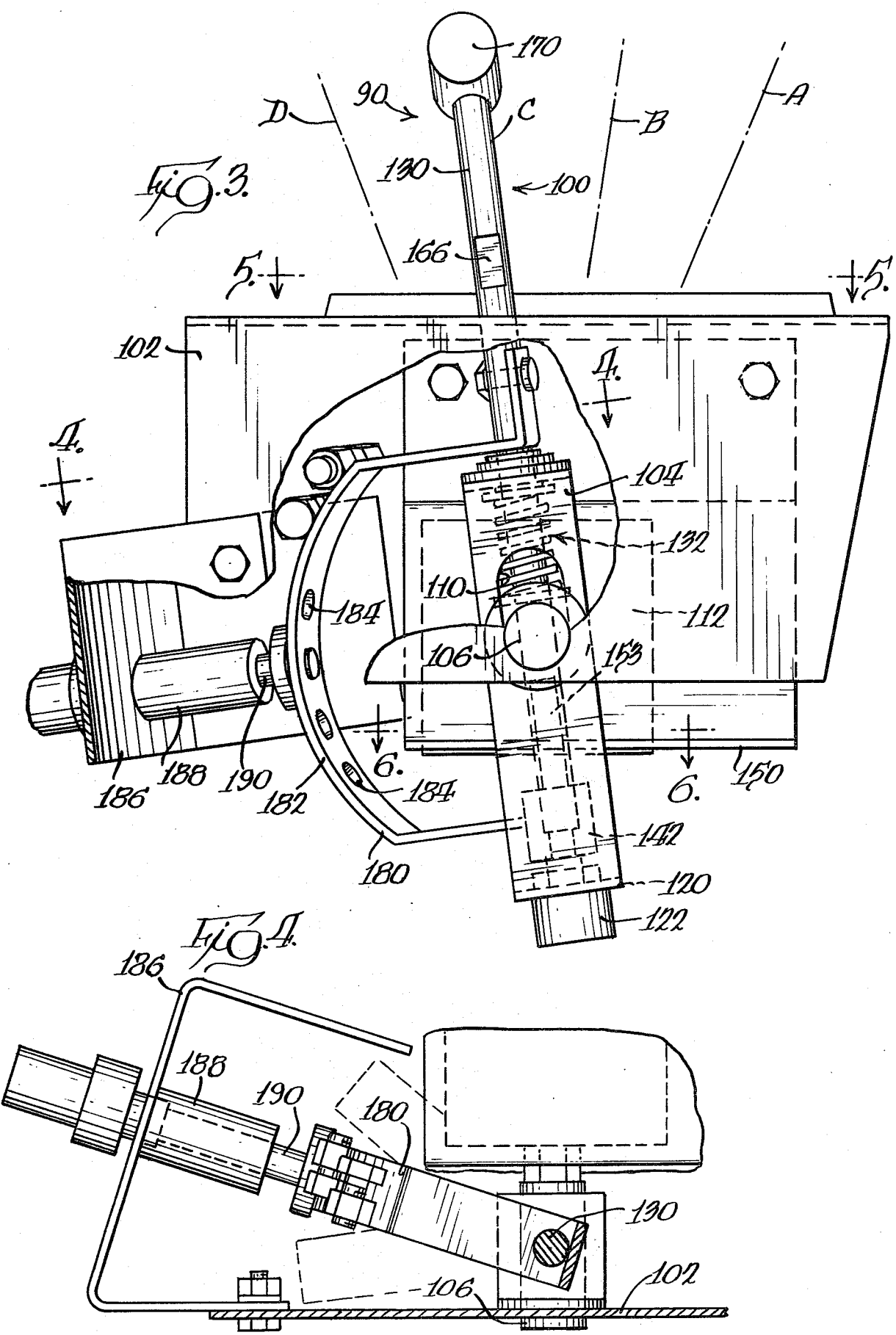

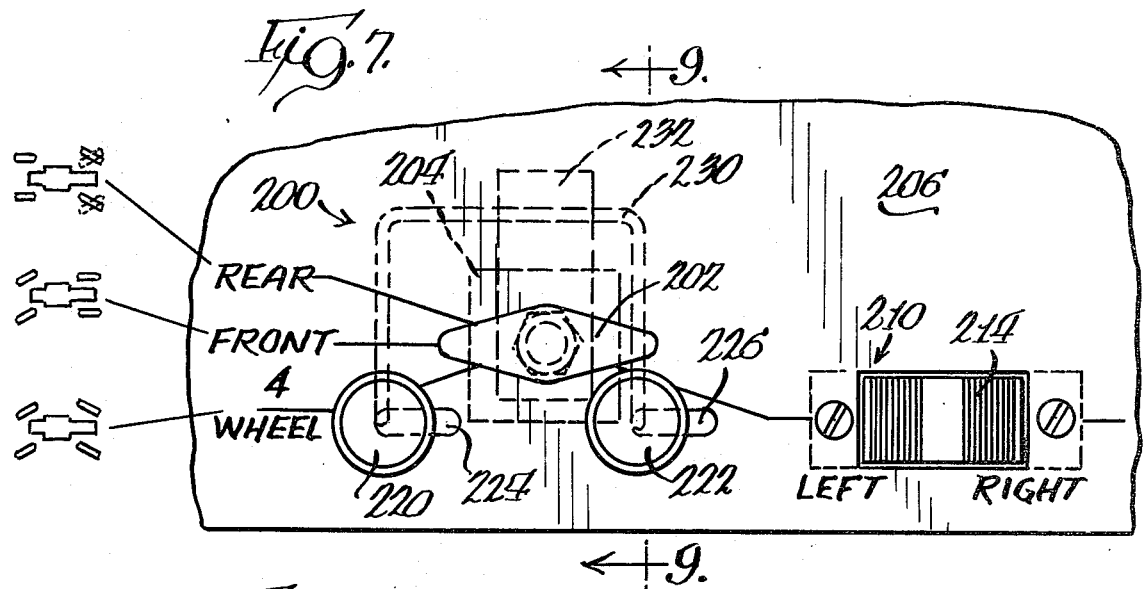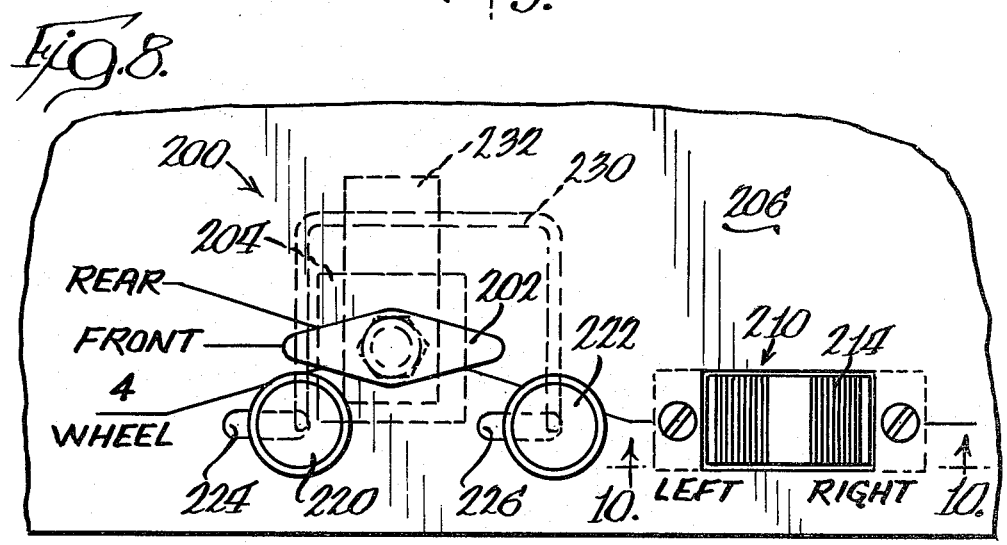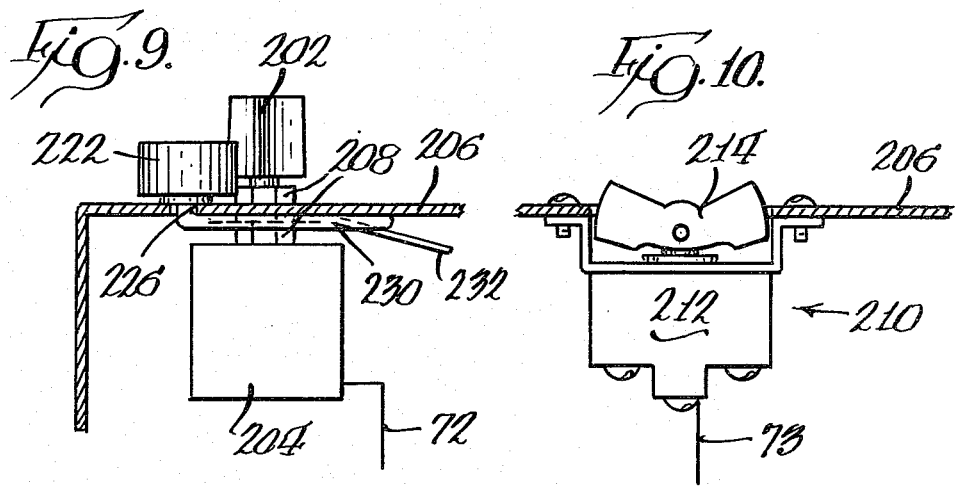

ELECTRONICALLY CONTROLLED FOUR-WHEEL STEERING

REFERENCE TO RELATED APPLICATIONS

This application is a continuation-in-part of U.S. Ser. No. 941,186, filed Sept. 11, 1978, now abandoned, which in turn is a continuation of U.S. Ser. No. 844,509, filed Oct. 21, 1977, now abandoned.

BACKGROUND OF THE INVENTION

The present invention relates generally to steering systems for vehicles and more particularly to a vehicle having four wheels including a pair of front wheels and a pair of rear wheels that can be turned to produce the desired steering function for the vehicle. One type of four-wheel steering control system has first and second means that respectively control the turning movement of the front pair and rear pair of wheels.

For many years, most vehicles were controlled exclusively through the use of a steering wheel that controlled turning movements for the front pair of wheels that support the vehicle, such as an agricultural tractor. Because of the vast increase in size of these types of vehicles in recent years, manufacturers' attention has been directed towards providing other steering systems that are more versatile than the conventional front wheel steering system.

In an effort to increase the versatility of the vehicle, four-wheel steering has become an area that has received a remarkable degree of attention. For example, many steering systems have been developed wherein the respective wheels can be individually controlled to have various modes of steering control for a vehicle. U.S. Pat. No. 3,903,983 discloses a steering system for a four-wheel vehicle in which the front and rear wheels can be turned in three different modes of operation. The first mode may be referred to as the front wheel steering only, or a neutral mode in which the rear wheels are locked in a predetermined position with respect to the frame of the vehicle. The second mode of steering is where the front and rear wheels are turned an equal amount but in the opposite direction, which in commonly referred to as cramp or coordinated steering. A third mode of steering is commonly referred to as crab steering wherein the front and rear wheels are angularly disposed with respect to the longitudinal axis of the vehicle at equal angles in the same direction so that the longitudinal axis of the vehicle is moved in a generally sidewise direction.

An additional mode of operation allows for independent control of the rear wheels as well as the front wheels when the vehicle is being operated in a crowded area. The capability of having manual control over the rear wheel turning movements has been found to be very advantageous, particularly when a vehicle, such as an agricultural tractor, is being manipulated towards an implement that is normally connected to the rear end of the vehicle.

The above patent discloses a coordinated system wherein the front and rear wheels can be independently controlled or the rear wheels can be automatically positioned as a function of the angular position of the front wheels. This is accomplished through a mechanical interconnection between the front and rear wheels through a lever control system.

While this system has been found to be a commercially accepted manner of controlling the turning movements of a vehicle, such an agricultural tractor having four driven wheels, and is incorporated into large agricultural tractors that are presently being sold by the assignee of the present invention, manufacturers are constantly striving for a more versatile system which can be manufactured at a lower cost and can also be incorporated into a basic vehicle without extensive modification of the basic structure of the vehicle.

Thus, manufacturers have recently directed their development of steering systems towards other types of coordinated systems such as electronically controlled, hydraulically actuated systems. The advantage of electronically controlled hydraulically actuated systems is that such systems do not require a mechanical interconnection between the front and the rear end of the vehicle since this can normally be accomplished through the use of electrical components so that only wires need to be used as the common link between two control systems that respectively control the front and rear wheel turning movements.

While many of these systems have been proposed, very few have received any significant degree of commercial exposure. While not specifically known, it is believed that one of the reasons for the lack of commercial acceptance of electronically controlled steering systems is that many of these proposed systems do not incorporate the conventional steering wheel which has been a standard fixture in the vehicle industry almost since its inception. In addition to the conventional steering wheel that most operators still prefer over other types of steering control systems, most of these agricultural vehicles also have various other control mechanisms for performing various functions. Again, these are usually performed by manipulating some type of control member that is supported in the operator's control console.

SUMMARY OF THE INVENTION

According to the present invention, a steering system has been developed wherein an agricultural vehicle having a pair of front wheels and a pair of rear wheels respectively turned through first and second independent means associated therewith. The steering system incorporates an electric control means that senses the angular position of the front wheels and the angular position of the rear wheels and produces output signals that are functions of these positions. The control means has switch means incorporated therein which is capable of conditioning the steering system for various modes of operation, such as crab steering, coordinated or radiarc steering, front wheel steering only, and independent rear wheel steering with or without front wheel steering. The control means incorporates signal producing means which produce a control signal that is integrated into the system and turns the rear wheels to a position which corresponds to the control signal.

According to the present invention, the front wheels can be steered or turned through the use of a conventional steering system while the rear wheels can automatically be positioned in various modes of operation in response to the turning movement of the front wheels. The selection of the mode of steering is accomplished through a movable control member or selector means that moves the switch means through a plurality of positions corresponding to the various modes of operation, one of which is independent rear wheel steering. In this mode of operation, the control member is in a position that the signal producing means can be operated and turn the rear wheels.

In one form of the invention, the actuating means is a control lever that is pivoted on the frame to a plurality of positions and connected to the switch means for moving the switch means to the respective positions corresponding to the respective modes of operation of the steering system. The control means also includes a mechanism for actuating the signal producing means and the mechanism is in the form of a rod which is capable of being rotated to vary the output signal eminating from the signal producing means.

The steering system also incorporates means for preventing rotation of the control rod when the control lever is in any mode of operation other than the rear steering mode and also incorporates detent means for preventing inadvertent shifting of the control lever from one steering mode to another steering mode.

In another version of the invention, the selector means is a control lever which is rotated on the support and moves the switch means through a plurality of positions for various modes of operation including rear wheel steering. In this version the mechanism that forms part of the selector means for operating the signal producing means for rear wheel steering includes a momentary contact switch which is capable of increasing or decreasing the output of the signal producing means.

BRIEF DESCRIPTION OF THE SEVERAL VIEWS OF THE DRAWINGS

FIG. 1 of the drawings schematically illustrates selected portions of a vehicle having a plural mode steering system incorporated therein;

FIG. 2 is an end elevation view, with parts thereof broken away for clarity, of the control lever that is capable of selecting the mode of steering;

FIG. 3 is a side elevation view, with parts thereof broken away for clarity;

FIG. 4 is a sectional view, as viewed along line 4—4 of FIG. 3;

FIG. 5 is a fragmentary top plan view, as viewed along line 5—5 of FIG. 3;

FIG. 6 is a fragmentary sectional view as viewed along line 6—6 of FIG. 3;

FIG. 7 is a fragmentary plan view of a modified form of the invention;

FIG. 8 is a view similar to FIG. 7;

FIG. 9 is a fragmentary sectional view as viewed along line 9—9 of FIG. 7; and

FIG. 10 is a fragmentary sectional view as viewed along line 10—10 of FIG. 8.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the invention to the embodiments illustrated.

FIG. 1 of the drawings discloses a small portion of a vehicle generally designated by the reference numeral 10, having a frame 12 of which only the rear and front axles are schematically illustrated. Vehicle 10 has a front pair of wheels 14 supporting frame 12 and a rear pair of wheels 16, only one of each being shown in FIG. 1.

The front pair of wheels 14 are generally respectively pivoted about vertical pivot axes 20 defined by king pins, through hydraulic motor means or fluid rams 22. Hydraulic fluid is supplied to motor means 22 through a pump 24 from a reservoir 26 and a power steering valve 28 which is controlled by a conventional steering wheel 30. Conduits 32 and 34 leading from steering valve 28 supply hydraulic fluid to one end of fluid ram 22 while connecting the opposite end to reservoir 26. While only one such fluid ram 22 has been shown, it will be appreciated that a second fluid ram cooperates with the other front wheel and the steering system may be considered means for controlling the turning movements of the front wheels.

Rear wheels 16 are also pivoted about vertical axes defined by king pins 36 through fluid rams 38, again only one being shown. Pressurized fluid is supplied to fluid ram 38 from reservoir 26 through a pump 40, valve 41 and conduits 42 and 44.

The steering system also incorporates control means for coordinating the turning movements of the rear wheels in response to turning movement of the front wheels in a plurality of modes of operation. This control means is schematically illustrated as a control box 50 which cooperates with first and second sensing means 52 and 54 respectively associated with the front and rear wheels and connected to control box 50 through wires 56 and 58. The respective sensing devices 52 and 54 produce an output signal through wires 56 and 58 which is the function of the angular position of the respective wheels and, dependent upon the selected mode of operation, produces an output signal through a wire 60 to a solenoid 62 of a proportional valve 64 that cooperates with the rear steering valve 41.

The steering system, particularly control means 50, also has a selector or actuator means 70 associated therewith which is capable of conditioning the control means for operating the four wheels in a plurality of steering modes, one of which includes independent rear steering. Selector means 70 has a first output signal 72 which conditions the control system 50 for the various modes of steering and a second output signal 73 which determines the angular position of the rear wheels when the control box 50 is in a rear steering control position. The proportional valve 64 and control means 50, including some type of selector means, and the signal producing means for controlling the rear wheels are available from Grade-Line, Inc., Woodinville, Wash., and the proportional valve 64 could be a Dynex proportional valve which is capable of accurately controlling the movement of the valve spool of control valve 41 to position rear wheel 16 as a function of either the position of the front wheels or as a function of the position of the output signal or control signal 73.

According to the present invention, selector means or actuator means 70 is in the form of a control lever that can be moved with respect to the frame to condition control means 50 for any one of a plurality of modes of operation. The control lever also has actuating means incorporated therein which is capable of varying the output signal or control signal to control means 50 when the system is conditioned for rear wheel steering. All of this is incorporated into an extremely simple actuator means that can be operated in a manner well known in the art so that no special instructional operations are necessary.

More specifically, the control lever illustrated in FIGS. 2 and 3 is capable of conditioning the steering system for four different modes of operation which are respectively schematically illustrated in FIG. 5. These four modes of operation are respectively front wheel only steering 80, coordinated or radiarc steering 82, rear wheel steering 84 and crab steering 86.

Referring to FIGS. 2 and 3, the selector and actuator means 70 consists of an actuation means 90 which includes a selector means or manual control lever 100 that is movable with respect to support 102 that may be considered part of frame 12. More specifically, control lever 100 consists of a member or substantially U-shaped bracket 104 that is pivoted with sleeve 106 which is rotatably supported on a pair of spaced legs of support 102.

U-shaped bracket 104 has a pair of elongated slots 110 so that the bracket can be shifted transversely of the axis of shaft or sleeve 106. Fixed support 102 also has a plural position switch 112 attached thereto and switch 112 has an actuator shaft 114 extending therefrom which is connected directly to sleeve or shaft 106 to rotate as a unit. Thus, pivotal movement of shaft 106 will move the switch through a plurality of positions as will be described later.

Bracket 104 has one leg extended substantially below shaft 106 and the extension has a horizontal portion 120 which supports a signal producing means or potentiometer 122. For purposes of subsequent discussion and as defined in the claims, switch 112 and potentiometer 122 are part of control box 50.

According to one aspect of the present invention, control lever 100 has actuating means in the form of an elongated rod 130 which is shiftable with bracket 104 and is also rotatable with respect to bracket 104 and shaft 106. An intermediate portion of rod 130 has biasing means 132 associated therewith for biasing rod 130 to a first axial position with respect to sleeve 106. Biasing means 132 (FIG. 2) is in the form of a collar 134 that is secured to rod 130 through a retaining ring 136 with a spring 138 engaging collar 134 and a further collar 139 on shaft 106. Biasing means 132 normally biases collar 136 towards the base portion of U-shaped bracket 104, as will be described later.

The lower end of rod 130 is connected directly to actuator 140 of potentiometer 122 through a sleeve 142 and set screws 144 which together define connection means between the control lever and the signal producing means so that the output control signal from potentiometer 114 can be changed by rotating rod 130.

According to another aspect of the present invention, the actuating means prevents rotational movement of control lever 100, particularly control rod 130 in any mode of operation other than the rear steering mode. For this purpose, bracket 102 includes a lower horizontal portion 150 which is disposed in the path of an intermediate portion 152 adjacent the lower end of rod 130. Lower intermediate portion 152 is produced by removing opposed portions of rod 130 so that the intermediate portion is substantially rectangular in cross section. Bracket portion 150 has a generally elongated slot 154 (FIG. 6) that has a width which is substantially equal to the width of rectangular portion 152. At a point in slot 154 which corresponds to the position C for control lever 100, elongated slot 154 has a circular portion 156 which corresponds in diameter to the diameter of rod 130. Thus, rod 130 cannot be rotated when control lever is in positions A, B or D but can be rotated when in position C, which corresponds to the independent rear steering mode 84.

According to another aspect of the invention, the actuator means also incorporates a detent means for preventing movement of the control lever from one steering mode to another steering mode when the control rod 130 is in its normally biased first axial position with respect to sleeve 106. Referring to FIGS. 2, 3 and 5, it will be noted that bracket 102 has a further horizontal portion 160 which extends across the pivotal path of movement of the upper end of rod 130. Bracket portion 160 has an elongated slot 162 through which rod 130 extends and slot 162 has a plurality (four) of enlarged circular portions 164 at spaced locations which correspond to the diameter of rod 130 and are positioned along the axes A, B, C, D for rod 130 that correspond to the steering modes 80, 82, 84, 86. An intermediate portion of the upper end of rod 130 has cutouts to define a reduced portion 166 that is substantially rectangular in cross section. Thus, control lever 100 cannot be moved from one steering mode to another without manually shifting rod 140 axially from the biased first position to a second position where rectangular portion 166 is aligned with slot 162. Preferably, rod 130 has a handle 170 at the upper end that can be gripped by the operator to produce such axial shifting.

Summarizing the steering system described above, when control lever or actuating means 100 is in the position A, the steering system is set for the tracking or straight ahead mode wherein the rear wheels are locked in a straight ahead position and the front wheels can be manually turned by manipulation of steering wheel 30. In this mode of operation, the control means or box 50 does not send any signals to the proportioning valve 64 and control valve 41 remains in a neutral condition.

Movement of the control lever to the position B will move actuator 114 of switch 112 to condition the control system or means 50 for a coordinated steering mode 82 (FIG. 3) wherein the front wheels are again manually turned through rotation of steering wheel 30. To move control lever to position B, rod 130 must be shifted axially to align rectangular portion 166 with slot 162, where the handle 170 can be released and allow spring 138 to move control lever 100 to its first position.

As the angle of front wheels 14 varies with respect to the axle centerline, the angle sensor 52 produces a voltage that is proportional to that angle through line 56 to controller 50. Likewise, the second angle sensor 54 mounted over the rear wheel king pin produces a voltage proportional to the angle of the rear wheels 16 with respect to rear axle centerline. Controller 50 then integrates these two signals and produces an output signal to solenoid 62 of proportional valve 64 to actuate control valve 41 in the appropriate direction by an appropriate amount to turn the rear wheels in the opposite direction to the front wheels. As the correct angle of the rear wheels 16, with respect to the front wheels 14, is reached, the voltage differential between signals 56 and 58 becomes zero and control valve 41 is then moved to a neutral position.

To change the steering mode from coordinated steering to the rear steering mode, the operator must again manually depress rod 130 to align rectangular portion 166 with slot 162 so that control lever 100 can be moved from the position B to position C illustrated in FIG. 3. With control lever 100 in position C, rectangular portion 152 of rod 130 is in enlarged circular portion 156 so that rotation of handle 120 about the axis of rod 130 will vary the output control signal from potentiometer 114 which will be fed to controller 50 through line 73 and this voltage will then be integrated with the voltage received from line 58 and sensor 54 so that roportional valve 46 again actuates control valve 41 in .ne appropriate direction to turn the wheels to a setting determined by the angular position of control handle 110.

Movement of the control lever 100 to position D will condition the steering system for crab steering where the rear wheels are turned in the same direction and an equal amount with the front wheels. It should be noted that rectangular portion 152 of rod 130 must be aligned with slot 154 before such change can be made.

As will be appreciated, the above control system provides an extremely unique and inexpensive manual control for selecting various modes of operation for an electrically controlled steering system and the actuating means also incorporates a mechanism for producing the rear steering function with the same control mechanism.

According to a further aspect of the invention, the control means also incorporates lock means for locking the control lever in any one of the respective positions. In the illustrated design, the lock means is specifically designed for locking the control lever in any one of the positions when the engine of the vehicle is shutdown. For this purpose, control lever 100 has a quadrant 180 secured thereto for movement therewith. Quadrant 180 has an arcuate portion 182 which has four openings 184. A further bracket 186 is secured to support 102 and bracket 186 supports a solenoid 188 having an outwardly directed spring biased plunger 190. The solenoid is connected to the electrical circuitry of the vehicle so as to be energized while the engine is running and to become deenergized when the engine is shutdown. In the energized condition, plunger 190 is in a retracted condition (not shown) so that arcuate portion 182 is free to move axially with rod 130 as well as angularly between the maximum positions illustrated in FIG. 4. If solenoid 188 is deenergized, when the engine is shutdown, plunger 190 will be forced into one of the holes 184 to lock lever 100 in a position.

If desired, the locking means may also incorporate mechanism for locking the rear wheels at a plurality of angular positions with respect to the axle center line. For example, quadrant 180 could be made narrow enough to be on either side of plunger 190 when the wheels are at a maximum angular position, such as 18 degrees, so that the rear wheels could be locked in three different angular positions. Of course, if it were desired, the lock means could also be used to lock the lever in a given position while the vehicle is operational.

A slightly modified and simplified version of selector means is illustrated in FIGS. 7–10 and replaces selector means 70 illustrated in FIG. 1. All of the remaining components illustrated in FIG. 1 remain the same and a detailed description thereof does not appear to be necessary.

In the modified embodiment, selector means or control member 200 includes a rotatable control member or knob 202 which cooperates with a switch 204 that is supported on a frame portion 206 which forms part of a vehicle, particularly the control console area of vehicle 10. Switch 204 and knob 202 are preferably supported by a plurality of lock screws 208 so that switch 204 is fixed to the lower surface of frame 206 and knob 202 is rotatable to move the actuator of switch 204 between a plurality of positions which correspond to a plurality of modes of controlling the turning movement of the rear wheels in response to turning movement of the front wheels.

As illustrated in FIGS. 7 and 8, knob or control member 202 is preferably generally diamond shaped in plan view and is movable between a plurality of distinct positions, three being illustrated in FIG. 7 of the drawings as rear steering, front steering and four wheel radiarc steering. When control knob 202 is moved between the three positions, switch 204 is also moved to corresponding position and sends a signal through line 72 to condition control means 50 for the particular mode of steering. Of course, additional modes of steering may be incorporated into the system if desired.

In the particular illustrated embodiment, the four wheel or radiarc steering condition has the rear wheels turning in the opposite direction to the front wheels at approximately the same amount so that the frame of the vehicle and the wheels move along a generally circumferential path. In the "front" wheel mode of operation, the rear wheels are locked in the straight ahead condition and steering is done in a conventional fashion. In the "rear" mode of operation the rear wheels can be controlled independently of the front wheels and the front wheels can likewise be turned through the use of the conventional steering wheel.

Turning movement of the rear wheels is controlled by a signal producing means 210 which is in the form of a momentary contact rocker switch 212 which is capable of varying a control signal through line 73 to control means 50 by appropriate actuation of an actuating member 214. Actuating member 214 is in the form of a rocker switch actuator which is normally biased to the position illustrated in FIG. 10 and is pivotable from the illustrated position in either direction indicated by "left" and "right" in FIG. 7. Thus, if the left-hand side of switch actuator 214 is momentarily moved downward, a control signal will be sent through line 73 to produce a turning movement of the rear wheels towards the left while movement of the other end of switch actuator 214 will produce a turning movement to the right.

According to one further aspect of the invention, and as a safety precaution, the selector means also incorporates a safety mechanism which normally prevents moving control member 202 between more than two positions without cautioning the operator that such action is taking place. For this purpose, control member 200 also includes a safety mechanism or rotational movement interruption means for preventing rotation of knob 202 beyond more than two positions without alerting the operator and requiring the operator to make a physical adjustment to move the steering mode to a further mode of operation.

As illustrated in FIGS. 7 and 8, control console 206 has a pair of members or knobs 220 and 222 slidably supported in elongated slots 224 and 226 and retained thereon through releasable retaining means which will be described later. Each knob or safety member 220 and 222 is slidable between extreme positions in the respective slots 224 and 226. Slots 224 and 226 are positioned adjacent opposite ends of the diamond shaped control knob 202 so that knob 220 is located in the path of rotational movement of one end of control member 202 in one position and is free to allow that end to move beyond knob 220 when the knob is moved to an opposite extreme position within slot 224. Likewise, knob 222 has a first position (illustrated in FIG. 7) wherein knob 222 is located in the path of rotational movement of control member 202 while in the second extreme position the second or opposite end of the knob is free to move past knob 222.

In the particular embodiment illustrated, knobs 220 and 222 are interconnected to move as a unit between extreme ends of slots 224 and 226. For this purpose, a generally U-shaped rod 230 extends generally parallel to the lower surface of control console 206 and has free ends connected to the respective members or circular knobs 220 and 222. Knobs 220 and 222 as well as interconnecting member 230 are retained adjacent the surface of control console 206 through a resilient spring 232 which is supported between lock nuts 208 and has a free end extending beyond the bite portion of U-shaped member 230.

Thus, assuming that control member or diamond shaped knob 202 is in the position illustrated in FIG. 7, and the safety latch mechanism is also in a position illustrated in FIG. 7, rotation of control knob 202 from the front steering mode to the rear steering mode is precluded by having knob or member 222 located in the rotational path of movement of the right-hand end of control member 202. However, in this condition, control member 202 can readily be rotated counterclockwise to change the steering mode from an intermediate or front steering mode to a four-wheel steering mode. If the safety latch mechanism 200 is in the position illustrated in FIG. 8, the control member can only be moved between the front steering mode and the rear steering mode.

Thus, it will be appreciated that the modified form of the invention, illustrated in FIGS. 7-10, provides an extremely inexpensive construction for providing accurate control of four steerable wheels in a plurality of modes of operation through the use of a conventional steering wheel. Furthermore, the construction is extremely simple and can readily be incorporated into new machinery with minimum modification thereof, since all of the components, particularly selector 204 and actuator 210, are readily available commercial units which can be purchased from various sources, and the connections require only electrical wires.

Of course, with respect to the embodiment illustrated in FIGS. 7-10, numerous modifications come to mind without departing from the spirit of the invention. For example, more than three modes of operation could readily be incorporated into the system by providing a switch means 204 having more than three positions such as that illustrated in the embodiment of FIGS. 2-6. Also, the safety mechanism could readily be designed so that an interference could be created for rotatable control member to prevent movement from one position to various other positions without the operator first being required to move some additional member to provide further safety features for the system.

What is claimed is:

1. A steering system for a vehicle including front and rear pairs of wheels with first means for simultaneously controlling the turning movement of said front wheels, second means for simultaneously controlling the turning movement of said rear wheels, first sensing means producing a first signal which is a function of the angular position of said front wheels, second sensing means producing a signal which is a function of the angular position of said rear wheels, control means receiving said signals, said control means including switch means having a plurality of positions for selecting a plurality of modes of controlling the turning movement of said rear wheels in response to turning movement of said front wheels and a rear steering mode where said rear wheels are controlled independent of said front wheels, the improvement of said control means including a fixed support with said switch means secured to said support, selector means mounted for movement on said support and connected to said switch means to move said switch means to said plurality of positions, signal producing means on said support and connected to said control means for introducing a control signal to said control means to produce independent turning movement of said rear wheels and actuator means connected to said signal producing means for varying said control signal only when said control means is in a rear steering mode.

2. A steering system as defined in claim 1, in which said selector means is a control lever pivoted on said support to move said switch means to said positions and is rotatable about an axis, further including connection means between said control lever and said signal producing means so that said control signal can be varied when said control lever is rotated about said axis to vary said control signal.

3. A steering system as defined in claim 2, further including means preventing rotation of said control lever when said control lever is in any mode other than said rear steering mode.

4. A steering system as defined in claim 2, in which said control lever includes a sleeve pivoted about a fixed axis on said support and said connection means includes a rod slidable in and pivoted with said sleeve.

5. A steering system as defined in claim 4, in which said connection means includes bracket means supporting said signal producing means and said rod for pivotal movement about said fixed axis, further including biasing means normally maintaining said rod and bracket means in a first position and accommodating movement of said bracket means and rod axially of said rod and means for preventing pivotal movement of said rod about said fixed axis when said rod is in said first position.

6. A steering system as defined in claim 5, in which said rod is rotated about its axis to vary said control signal, further including means preventing rotation of said rod when said control lever is in other than said position corresponding to said rear steering mode.

7. A steering system as defined in claim 6, further including lock means for locking said control lever in a position corresponding to a given mode of operation, said lock means becoming operational when said vehicle is inoperative.

8. A steering system as defined in claim 1, in which said selector means includes a knob rotatable between extreme positions on said support and connected to said switch means and said actuator means includes a further switch for varying said control signal.

9. A steering system as defined in claim 8, further including a safety mechanism cooperating with said knob for preventing movement of said knob from one extreme position to another extreme position in one continuous motion.

10. A steering system as defined in claim 8, in which said further switch includes an actuator normally biased to a center neutral position which is movable in one direction to produce a turning movement of said rear wheels in one direction and movable in an opposite direction to produce turning movement of said rear wheels in the opposite direction.

11. A steering system as defined in claim 9, in which said safety mechanism includes first and second spaced slidable members respectively movable into and out of a path of rotational movement of said knob.

12. A steering system for a vehicle including a frame having a pair of front wheels and a pair of rear wheels with first and second means respectively controlling turning movements of said front and rear wheels, first and second sensig means respectively sensing the angular position of said front and rear wheels respectively with respect to said frame and producing respective output signals, control means receiving said output signals, said control means including switch means having a plurality of positions respectively defining different modes of steering for said rear wheels in response to turning movement of said front wheels and one mode where said rear wheels are controlled independently, said control means including signal producing means producing a control signal and actuator means for actuating said switch means and said signal producing means, the improvement of said actuator means including a control lever pivoted on said frame for movement to a plurality of positions and connected to said switch means for moving said switch means to said plurality of positions, and actuating means forming part of said control lever and cooperating with said signal producing means when said control lever and switch means are in a position corresponding to said one mode so that said control lever can be moved to vary said control signal and control turning movement of said rear wheels.

13. A steering system as defined in claim 12, in which said actuator means includes a member pivoted on said support about a fixed pivot axis and a bracket pivoted with and shiftable transversely of said fixed axis with said signal producing means supported on said bracket and in which said actuating means includes a rod in engagement with said signal producing means and rotatable on said bracket.

14. A steering system as defined in claim 13, further including means preventing rotation of said rod when said actuator means is in a position other than said one mode.

15. A steering system as defined in claim 14, in which said means preventing rotation includes a member disposed in the pivotal path of said rod and having an elongated slot therein and said rod has a rectangular portion in said slot preventing rotation when said actuator means is in a position other than said one mode.

16. A steering system as defined in claim 13, further including biasing means between said member and bracket normally maintaining said bracket in a first position and detent means preventing pivotal movement of said bracket and rod in said first position.

17. A steering system for a vehicle including front and rear pairs of wheels with first means for simultaneously controlling the turning movement of said front wheels, second means for simultaneously controlling the turning movement of said rear wheels, first sensing means producing a first signal which is a function of the angular position of said front wheels, second sensing means producing a signal which is a function of the angular position of said rear wheels, control means receiving said signals, said control means including switch means movable to define a plurality of positions for selecting a plurality of modes of controlling the turning movement of said rear wheels in response to turning movement of said front wheels and a rear steering mode where said rear wheels are controlled independent of said front wheels, and control means for actuating said switch means, the improvement of said control means including a fixed support with said switch means secured to said support, a selector member mounted for rotation between extreme positions on said support and connected to said switch means to move said switch means to said plurality of positions, signal producing means on said support and connected to said control means for introducing a control signal to said control means to produce independent turning movement of said rear wheels, said signal producing means including a switch actuator for varying said control signal to turn said rear wheels independently of said front wheels, and safety limiting means normally preventing said selector member from being rotated from one extreme position to the other extreme position.

18. A steering system as defined in claim 17, in which said control member is an elongated knob and said safety limiting means includes a pair of spaced interconnected members slidably supported on said support between first and second positions and in which a first member is located in the rotational path of movement of said elongated knob in said first position to prevent said knob from being moved to one extreme position and a second member is located in the rotational path of movement of said elongated knob in said second position to prevent said knob from being moved to the other extreme position.

19. A steering system as defined in claim 17, in which said signal producing means and said actuator are defined by a momentary contact rocker switch having the actuator normally biased to a neutral position.

* * * * *